(12) United States Patent
Jang et al.

(10) Patent No.: US 8,081,193 B2
(45) Date of Patent: *Dec. 20, 2011

(54) COLOR MANAGEMENT METHOD AND APPARATUS THEREOF

(75) Inventors: Mi-jung Jang, Suwon-si (KR);
Kyeong-man Kim, Suwon-si (KR);
Hyun-soo Oh, Suwon-si (KR)

(73) Assignee: Samsung Electronics Company, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,829

(22) Filed: Mar. 23, 2010

(65) Prior Publication Data

US 2010/0201704 A1 Aug. 12, 2010

Related U.S. Application Data

(63) Continuation of application No. 11/268,521, filed on Nov. 8, 2005, now Pat. No. 7,714,874.

(30) Foreign Application Priority Data

Nov. 9, 2004 (KR) .............................. 10-2004-90923

(51) Int. Cl.
*G09G 5/02* (2006.01)
(52) U.S. Cl. ........ 345/594; 345/500; 345/518; 345/591; 345/593; 345/597; 345/601

(58) Field of Classification Search ................. 345/591, 345/593, 594, 597, 601; 358/500, 518
See application file for complete search history.

(56) References Cited

U.S. PATENT DOCUMENTS

| 5,331,439 A | 7/1994 | Bachar |
| 5,334,992 A | 8/1994 | Rochat et al. |
| 5,508,718 A | 4/1996 | Haikin |
| 5,611,028 A | 3/1997 | Shibasaki et al. |
| 6,236,406 B1 | 5/2001 | Li |
| 2003/0002095 A1 | 1/2003 | Gruzdev et al. |

FOREIGN PATENT DOCUMENTS

| JP | 2002-074380 | 3/2002 |
| KR | 2001-0022983 | 3/2001 |

*Primary Examiner* — Kimbinh T Nguyen
(74) *Attorney, Agent, or Firm* — Roylance, Abrams, Berdo & Goodman, L.L.P.

(57) ABSTRACT

Disclosed are a color management method, an apparatus thereof and a color management computer program for executing the method that enable a user to conveniently and easily select and/or change colors desired by the user in diverse ways. The color management method includes displaying a color scheme list that is a list of color schemes for providing a standard for converting the colors that constitute an image, and if a selection manipulation of one among the color schemes that constitute the displayed color scheme list is input, storing the color scheme selected by the selection manipulation.

18 Claims, 8 Drawing Sheets

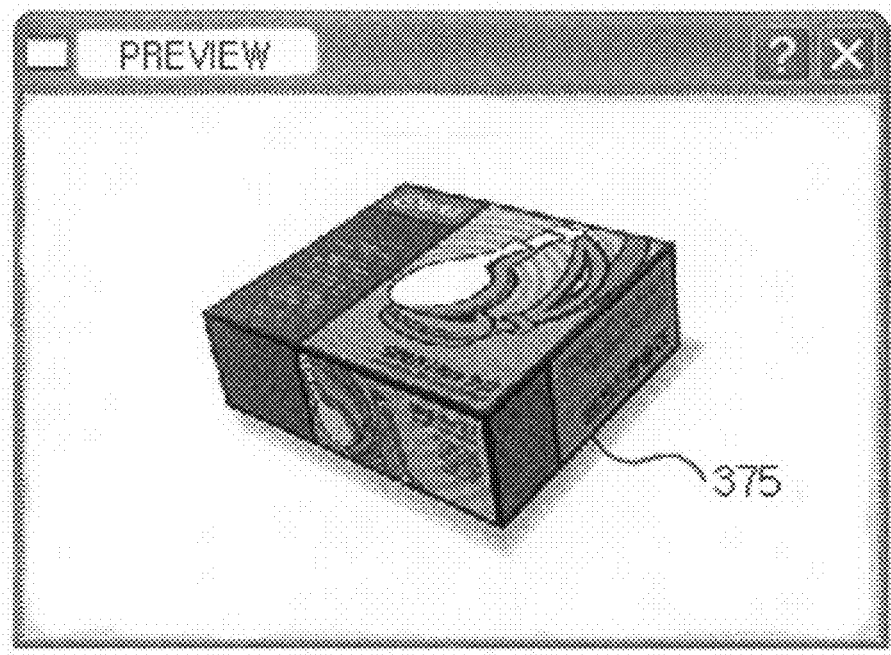

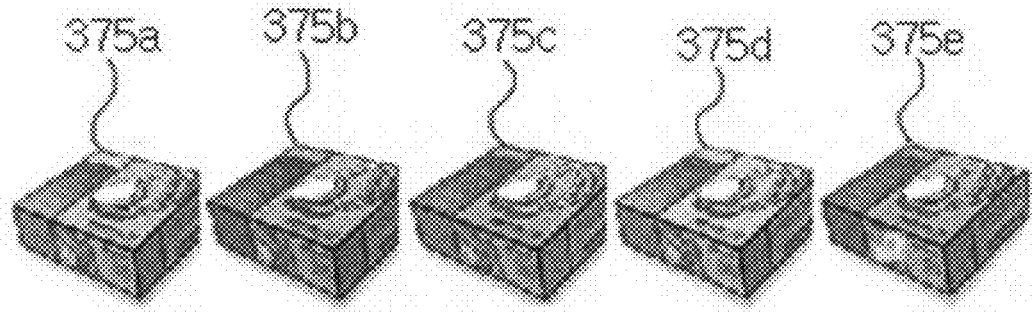

COLOR MANAGEMENT METHOD AND APPARATUS THEREOF

CROSS-REFERENCE TO RELATED APPLICATIONS

This application is a continuation application under 35 U.S.C. §120 of U.S. Non-provisional application Ser. No. 11/268,521, now U.S. Pat. No. 7,714,874, filed on Nov. 8, 2005 in the U.S. Patent and Trademark Office, the entire disclosure is incorporated herein by reference. Additionally, this application claims the benefit under 35 U.S.C. §119(a) of Korean Patent Application No. 2004-90923, filed on Nov. 9, 2004 in the Korean Intellectual Property Office, the entire disclosure of which is hereby incorporated by reference.

BACKGROUND OF THE INVENTION

1. Field of the Invention

The present invention relates to a color management method, an apparatus thereof and a color management computer program for executing the method. More particularly, the present invention relates to a color management method, an apparatus thereof and a color management computer program for executing the method that enables a user to select and/or change a color desired by the user and to store the selected/changed color so that the user can use the stored color later on.

2. Description of the Related Art

Recently, with the spread of color printers, digital cameras, personal home pages, and the like, opportunities for ordinary people to interact with color images have increased. Accordingly, the ordinary person's interest in the editing of the color image has also been increased.

As a result, color image editing programs for proving a function of enabling the ordinary person to easily edit color images have been developed.

Additionally, a color management program that generates and stores colors to be used in such a color image editing program so that the ordinary person can use the stored colors later on has been developed.

The color management program should be prepared so that an ordinary person can easily use the program, and a user interface screen provided by the program should also be designed in consideration of the ordinary person's easy use of the program.

Additionally, the color management program should satisfy the user's desire for color creation in diverse ways by providing new functions that can create colors in different ways from the existing way.

Accordingly, there is a need for an improved method and apparatus for managing the selection and storage of colors in an image editing program, and the like.

SUMMARY OF THE INVENTION

The present invention has been developed in order to solve the above mentioned drawbacks and other problems associated with the conventional arrangement, and to provide other advantages that will be recognized from the following description. An aspect of the present invention is to provide a color management method, an apparatus thereof and a color management computer program for executing the method which enables a user to conveniently and easily select and/or change colors desired by the user in diverse ways and to store the selected/changed colors so that the user can subsequently use the stored colors.

The foregoing and other objects and advantages are substantially realized by providing a color management method which comprises the steps of displaying a color scheme list that is a list of color schemes for providing a standard for converting the colors that constitute an image, and if a selection manipulation of one among the color schemes that constitute the displayed color scheme list is input, storing the color scheme selected by the selection manipulation.

The color management method may further comprise the step of storing the color scheme of which the color scheme information is changed by the change manipulation if a change manipulation of color scheme information of the selected color scheme is input.

The color management method may further comprise the step of converting the stored color scheme so that the stored color scheme can be used in a program for image editing.

It is preferable that the color scheme is composed of colors schemed in order to present a specified color emotion.

It is preferable that the color scheme list is a list in which the color schemes are arranged in one dimension, in two dimensions or in three dimensions.

It is preferable that the color management method further comprises the steps of displaying a standard color list in which standard colors are arranged in three dimensions, and if a selection manipulation of one among the standard colors that constitute the displayed standard color list is input, storing the standard color selected by the selection manipulation.

It is preferable that the color management method further comprises the steps of displaying a memory color list which is a list of memory colors that are colors of things and that are named and memorized as names of the things, and if a selection manipulation of one among the memory colors that constitute the displayed memory color list is input, storing the memory color selected by the selection manipulation.

The color management method may further comprise the step of storing the memory color of which the color information is changed by the change manipulation if a change manipulation of color information of the selected memory color is input.

The color management method may further comprise the step of converting the stored memory color so that the stored memory color can be used in an image editing program.

It is preferable that the memory color list is a list in which the memory colors are arranged in one dimension, in two dimensions or in three dimensions.

According to another aspect of the present invention, there is provided a color management apparatus which comprises a display unit for displaying a specified list, an input unit for inputting a specified manipulation command, a storage unit for storing specified information, and a processor for displaying on the display unit a color scheme list that is a list of color schemes for providing a standard for converting the colors that constitute an image. If a selection manipulation of one among the color schemes that constitute the displayed color scheme list is input by the input part, the color scheme selected by the selection manipulation is stored to the storage unit.

It is preferable that the color scheme is composed of colors schemed in order to present a specified color emotion.

The processor may display on the display unit a standard color list in which standard colors are arranged in three dimensions, and if a selection manipulation of one among the standard colors that constitute the displayed standard color list is input by the input part, store to the storage unit the standard color selected by the selection manipulation.

It is preferable that the processor displays on the display unit a memory color list which is a list of memory colors that are colors of things and that are named and memorized as names of the things, and if a selection manipulation of one among the memory colors that constitute the displayed memory color list is input by the input part, the processor stores the memory color selected by the selection manipulation to the storage unit.

In still another aspect of the present invention, there is provided a computer-readable recording medium that records a color management program for executing the steps of displaying a color scheme list. The color scheme list is a list of color schemes for providing a standard for converting the colors that constitute an image. If a selection manipulation of one among the color schemes that constitute the displayed color scheme list is input, the color scheme selected by the selection manipulation is stored.

It is preferable that the color scheme is composed of colors schemed in order to present a specified color emotion.

The color management program may further execute the steps of displaying a standard color list in which standard colors are arranged in three dimensions, and if a selection manipulation of one among the standard colors that constitute the displayed standard color list is input, storing the standard color selected by the selection manipulation.

It is preferable that the color management program further executes the steps of displaying a memory color list which is a list of memory colors that are colors of things and that are named and memorized as names of the things, and if a selection manipulation of one among the memory colors that constitute the displayed memory color list is input, storing the memory color selected by the selection manipulation.

BRIEF DESCRIPTION OF THE DRAWINGS

The above aspects and features of the present invention will be more apparent by describing certain embodiments of the present invention with reference to the accompanying drawings, in which:

FIGS. 5A and 5B are views provided for a detailed explanation of an image conversion according to color schemes according to an embodiment of the present invention.

Throughout the drawings, like reference numbers should be understood to refer to like elements, features, and structures.

DETAILED DESCRIPTION OF EXEMPLARY EMBODIMENTS

Exemplary embodiments of the present invention will now be described in greater detail with reference to the accompanying drawings.

The matters defined in the description such as a detailed construction and elements are provided to assist in a comprehensive understanding of the invention. Thus, it should be apparent to one of ordinary skill in the art that various changes and modifications to the exemplary embodiments described herein can be made without departing from the scope and spirit of the invention. Also, descriptions of well-known functions or constructions are omitted for clarity and conciseness.

In the following description, the term 'color' includes a standard color, a memory color, an extraction color, and so on. The memory color means the color of a thing that is named and memorized as a name of the thing. For example, colors of 'sky', 'grass', and so on, correspond to the memory color. An extraction color is a color extracted from an image displayed on a display screen, and means the color of a pixel selected among pixels that constitute the image.

Additionally, the term 'color' includes a color scheme. A color scheme is composed of two or more schemed colors in order to present a specified color emotion. The color emotion may be a clear emotion, a natural emotion, an elegant emotion, or the like, and several color schemes may present one color emotion.

By converting the colors which constitute an image according to the color scheme, the color emotion presented by the image can be changed. For example, by converting the colors which constitute the image that presents a clear image according to the color scheme for presenting the natural emotion, the color emotion presented by the image is changed from the clear emotion to the natural emotion. In changing the color emotion presented by the image, the color scheme appears to provide a basis of converting the colors that constitute the image.

Hereinafter, exemplary embodiments of the present invention will be explained in more detail with reference to accompanying drawings.

Figure 1:
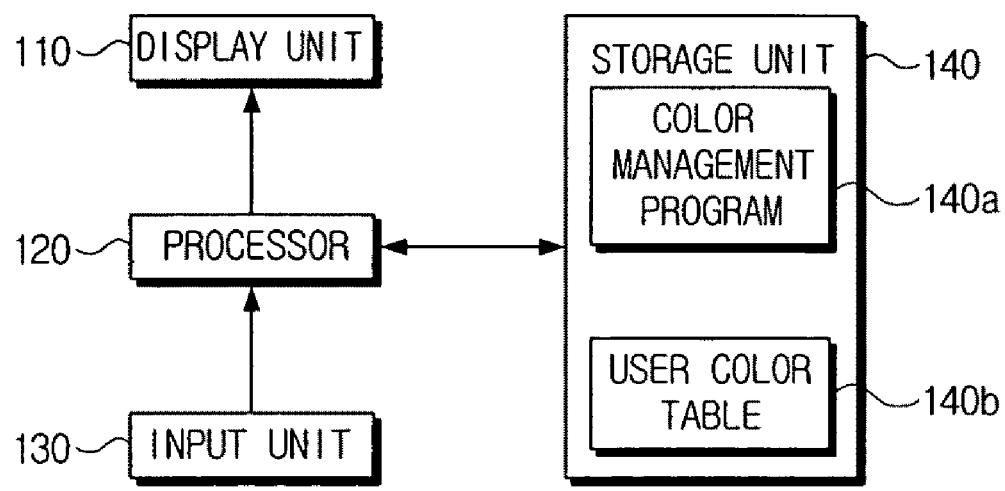
FIG. 1 is a block diagram of a color management apparatus according to an embodiment of the present invention.

FIG. 1 is a block diagram of a color management apparatus according to an embodiment of the present invention. The color management apparatus is an apparatus capable of executing a color management program to be explained later, and the representative examples thereof may be a PC, a PDA (Personal Digital Assistant), and the like. Referring to FIG. 1, the color management apparatus includes a display unit 110, a processor 120, an input unit 130 and a storage unit 140.

The display unit 110 is a display means for displaying specified information, and is generally implemented by a monitor, LCD (Liquid Crystal Display), or the like. The input unit 130 is a user interface means for receiving and transferring a user's manipulation command to the processor 120, and is generally implemented by a keyboard, a mouse, a keypad, and the like.

The storage unit 140 is a recording medium in which programs used in the color management apparatus and data are stored, and is generally implemented by a hard disc drive, a memory, and so on. In the storage unit 140, a color management program 140*a*, a user color table 140*b*, among other things, are stored.

The color management program 140*a* is a program prepared to select and store a color desired by a user as a user color and to convert the stored user color so that it can be used in an image editing program. Additionally, the color management program 140*a* may change color information (such as, hue/value/saturation) of the selected color according to a user's desire and store the color having the changed color information as the user color. Specifically, the color management program 140*a* is a program prepared to execute an algorithm as illustrated in a flowchart of FIG. 2 to be described later.

The user color table 140b is a table having a database of the user colors as described above. For convenience in explanation, although only one user color table 140b is illustrated in FIG. 1, user color tables to be stored in the storage unit 140 are not limited in number.

The processor 120 performs the color management by executing the color management program 140a stored in the storage unit 140. In this manner, the processor 120 provides a color management interface screen provided by the color management program 140a to the user by displaying the color management interface menu screen through the display unit 110. Additionally, the processor 120 stores the color that corresponds to the user's selection/change manipulation input through the color management interface menu screen in the user color table 140b as the user color.

Figure 2:
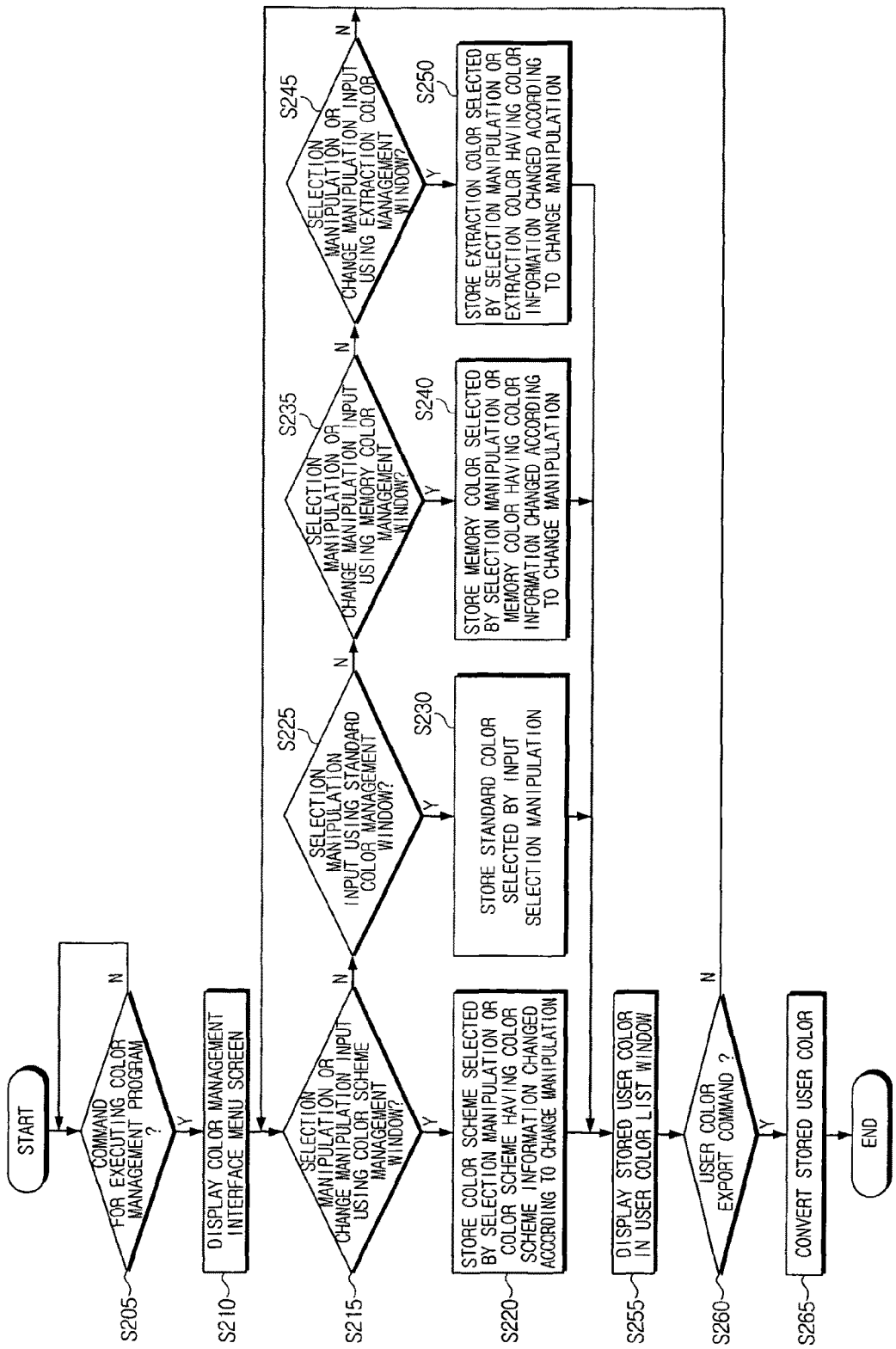
FIG. 2 is a flowchart provided for an explanation of a color management method according to an embodiment of the present invention.

A color management process performed by the processor 120 through the execution of the color management program 140a is illustrated in FIG. 2. Hereinafter, the process of performing the color management through the processor 120 will be explained in detail with reference to FIG. 2.

If the user inputs a command for executing the color management program 140a (step S205), the processor 120 displays the color management interface menu screen provided by the color management program 140a on the display unit 110 by executing the color management program 140a (step S210).

Figure 3:
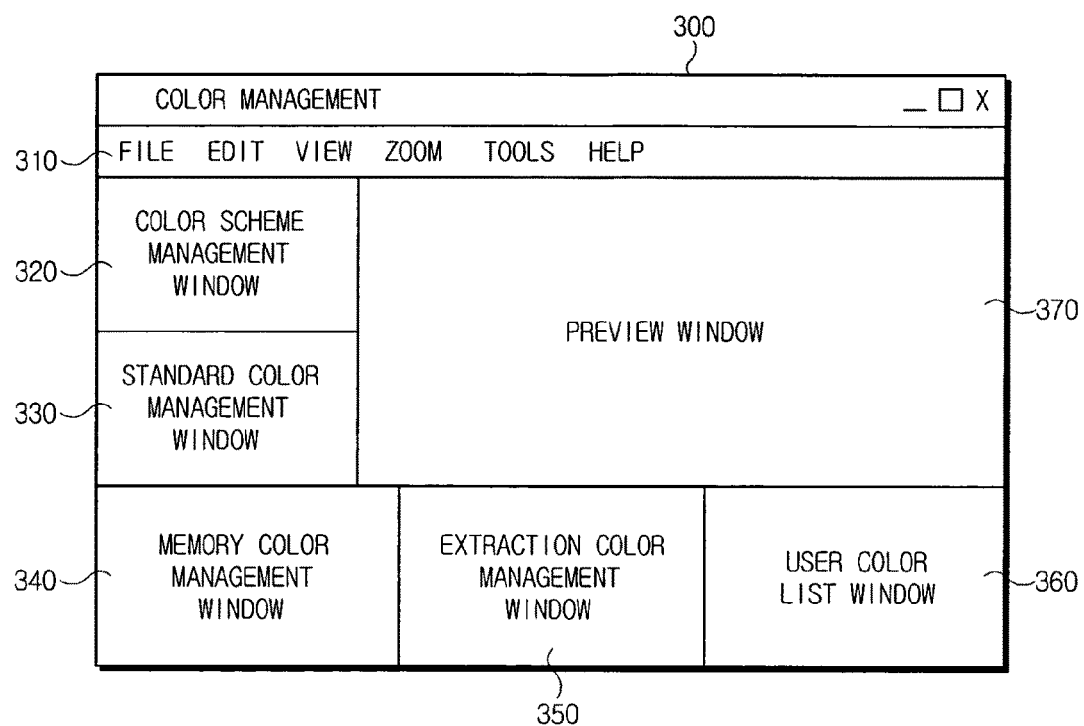
FIG. 3 is a view illustrating an example of an interface screen for color management according to an embodiment of the present invention.

The color management interface screen is an interface screen used for the input of i) a color selection manipulation, ii) a change manipulation of color information of the selected color, iii) a storage command for storing the selected/changed color as the user color, and iv) a conversion command for converting the stored user color. An example of the color management interface screen is illustrated in FIG. 3. As illustrated in FIG. 3, an exemplary color management interface screen 300 is provided with a menu item bar 310 having various kinds of menu items such as 'File', 'Edit', 'View', 'Zoom', 'Tools', and 'Help', a color scheme management window 320, a standard color management window 330, a memory color management window 340, an extraction color management window 350, a user color list window 360 and a preview window 370.

The user can input the color selection manipulation and the change manipulation of color information of the selected color using any one of the color scheme management window 320, the standard color management window 330, the memory color management window 340 and the extraction color management window 350. Additionally, the user can input the storage command and the conversion command using the menu item bar 310.

The color scheme management window 320 is a window used for the user's input of a selection manipulation of a color scheme and a change manipulation of color scheme information of the selected color scheme. An example of the color scheme management window 320 is illustrated in FIG. 4A.

Figure 4A:
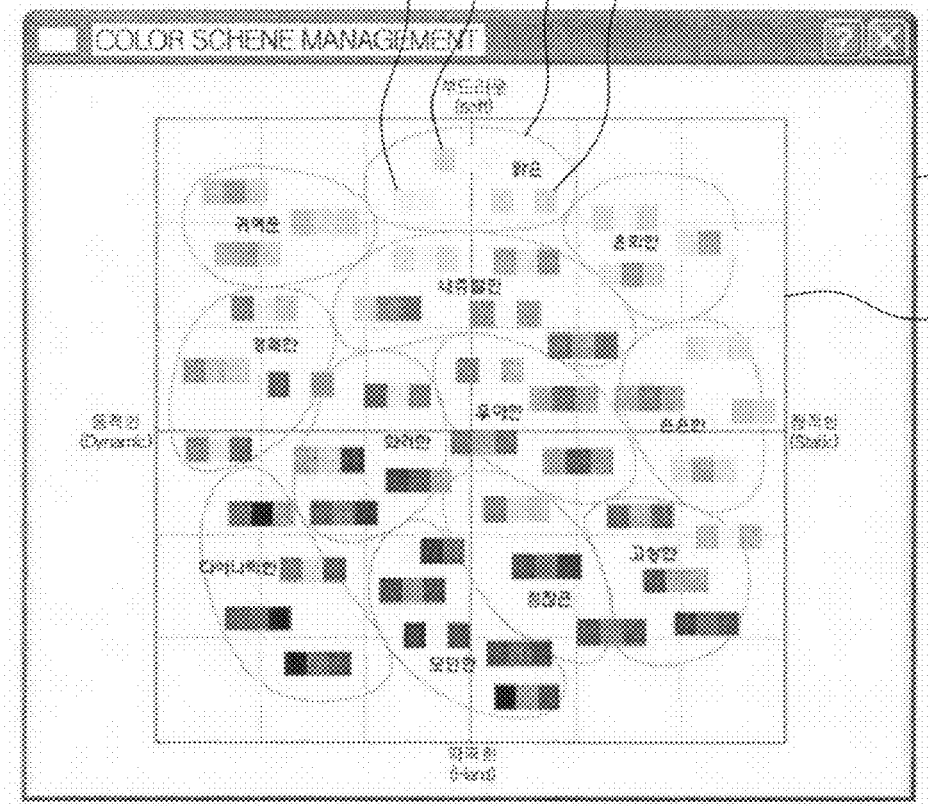
FIG. 4A is a view illustrating an example of a color scheme management window according to an embodiment of the present invention.

As illustrated in FIG. 4A, in the color scheme management window 320, a color scheme list 325 in which the color schemes are arranged in two dimensions is displayed. Also, in the color scheme list 325, the color schemes having the same color emotion are classified into one group. For example, three color schemes 325A-1, 325A-2 and 325A-3 for presenting a clear emotion 325A are classified into a group 325A.

The user can select a desired color scheme on the color scheme list 325 displayed in the color scheme management window 320. In addition, the user can change the color scheme information of the selected color scheme. The change of the color scheme information is performed in a manner that all or a part of the color information (such as, hue/value/saturation) are changed with respect to all or a part of the colors that constitute the color scheme.

The standard color management window 330 is a window used for the user's input of a standard color selection manipulation. An example of the standard color management window 330 is illustrated in FIG. 4B.

Figure 4B:
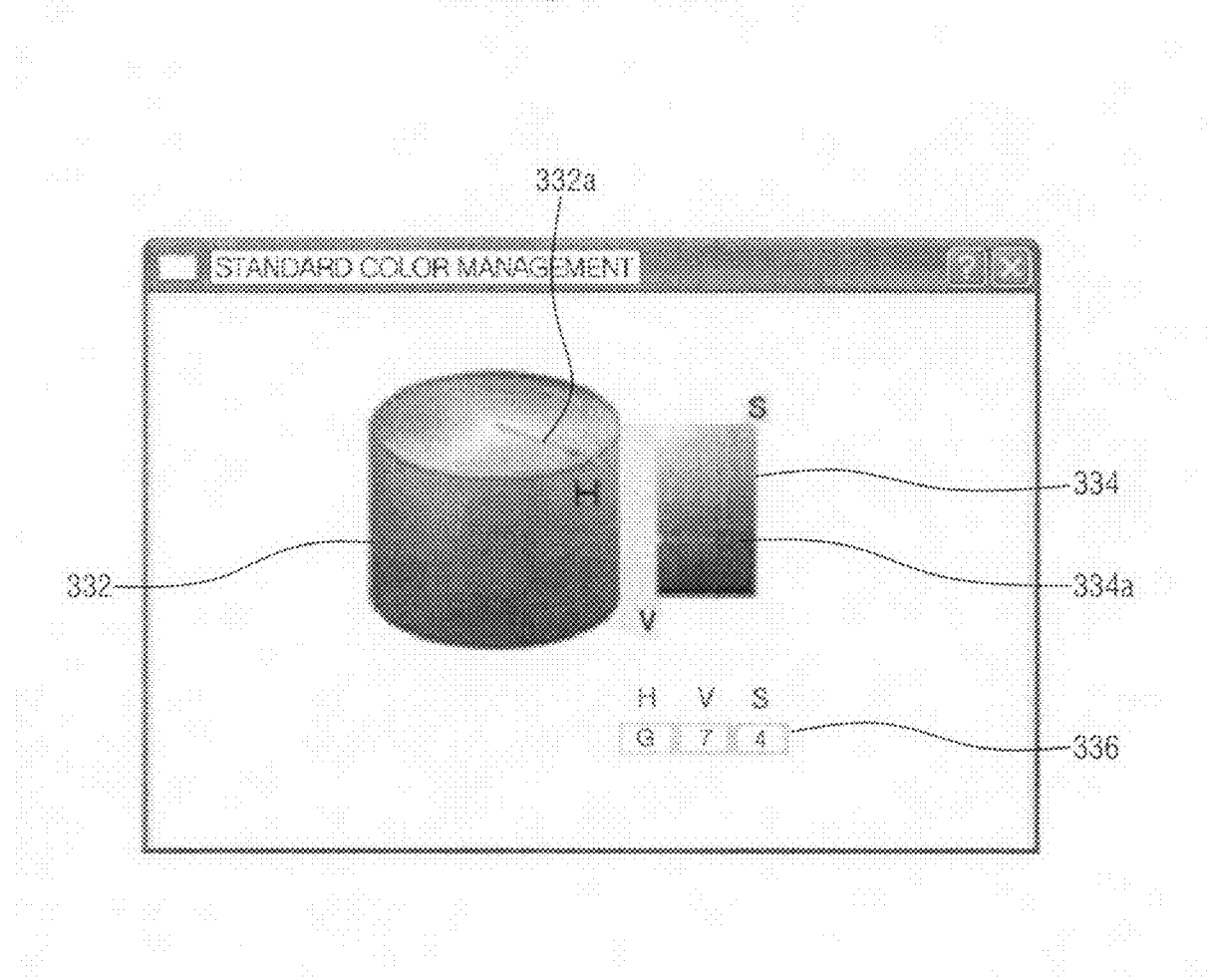
FIG. 4B is a view illustrating an example of a standard color management window according to an embodiment of the present invention.

As illustrated in FIG. 4B, in the standard color management window 330, a solid shape of color 332 is displayed as a standard color list in which the standard colors are arranged in three dimensions. The user can input a selection manipulation for a desired hue (H) by manipulating the rotation of an indication bar 332a prepared in the solid shape of color 332. At this time, the solid shape of color 332 may be implemented to rotate so that the hue (H) indicated by the indication bar 332a (that is, selected by the user) is displayed in front of the display screen.

Additionally, on the left of the solid shape of color 332, a value/saturation (V/S) table 334 for the hue (H) indicated by the indication bar 332a is displayed in two dimensions. The value/saturation (V/S) table 334 corresponds to a section obtained when the solid shape of color 332 is cut along the indication bar 332a. The user can input the selection manipulation of the desired value (V) and saturation (S) by manipulating the movement of a pointer 334A prepared in the value/saturation (V/S) table 334 up/down/right/left.

On the lower part of the value/saturation (V/S) table 334, H/V/S information 336, which represents the hue (H) indicated by the indication bar 332a and the value/saturation (V/S) indicated by the pointer 334A as text information, is displayed.

Figure 4C:
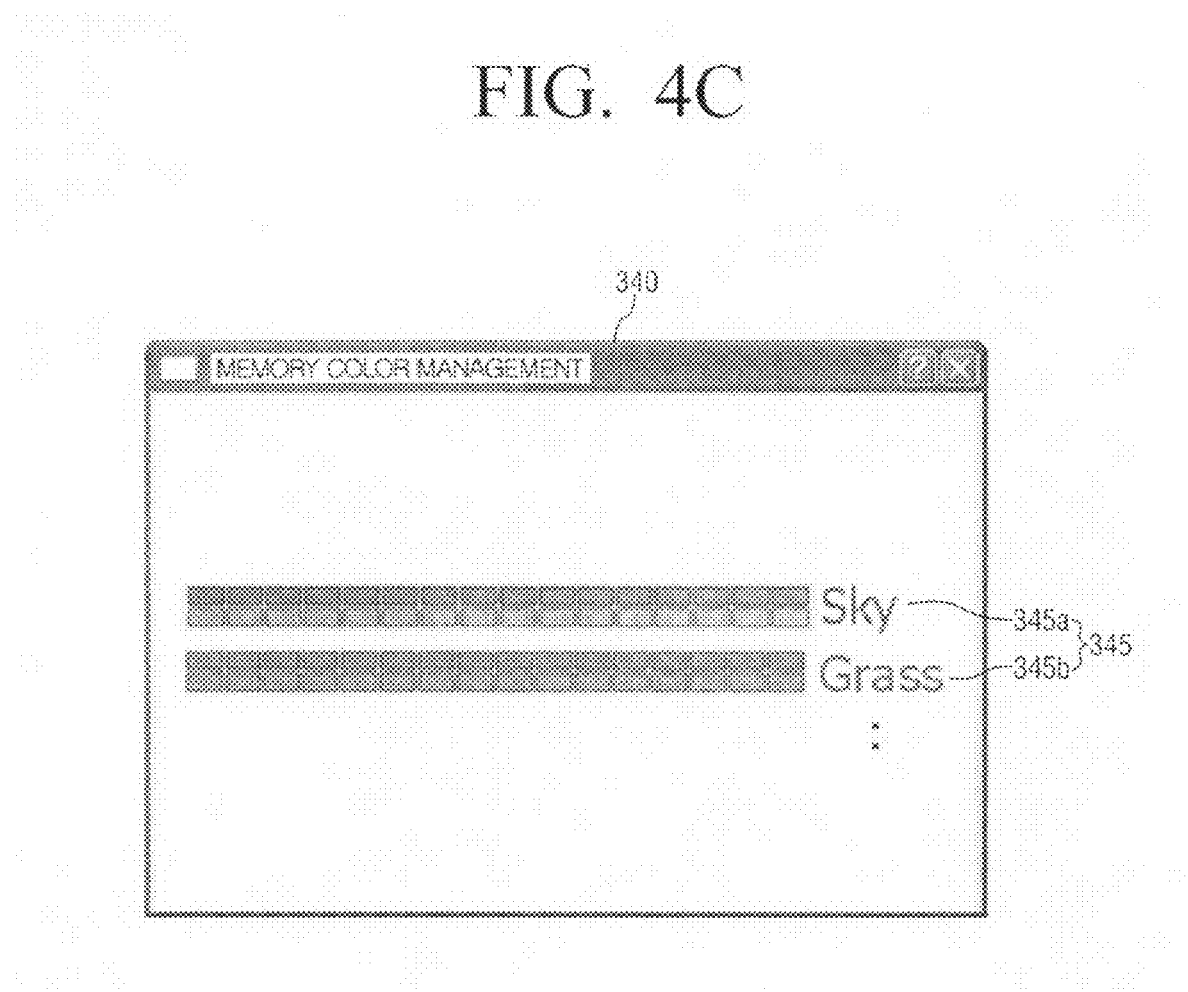
FIG. 4C is a view illustrating an example of a memory color management window according to an embodiment of the present invention.

The memory color management window 340 is a window used for the user's input of a selection manipulation of a memory color and a change manipulation of color information of the selected memory color. An example of the memory color management window 340 is illustrated in FIG. 4C. As illustrated in FIG. 4C, in the memory color management window 340, a memory color list 345 in which memory colors 345A and 345B are arranged is displayed.

The user can select a desired memory color on the memory color list 345 displayed in the memory color management window 340. In addition, the user can change all or a part of the color information (that is, hue/value/saturation) of the selected memory color.

The extraction color management window 350 is a window used for the user's input of a selection manipulation of an extraction color to be extracted from the displayed image and a change manipulation of the color information of the selected extraction color.

The user color list window 360 is a window for displaying a user color list in which user colors on the color table 140b are arranged. Additionally, the preview window 370 is a window in which an image called by the user using the menu item bar 310 is displayed.

Referring again to FIG. 2, the process after step S210 will now be explained.

If the user inputs the selection manipulation of the color scheme or the change manipulation of the color scheme information of the selected color scheme using the color scheme management window 320 (step S215), the processor 120 stores the color scheme selected by the input selection manipulation or the color scheme having the color scheme information changed by the input change manipulation in the user color table 140b as the user color (step S220).

If the user inputs the selection manipulation of the standard color using the standard color management window 330 (step S225), the processor 120 stores the standard color selected by the input selection manipulation in the user color table 140b as the user color (step S230).

If the user inputs the selection manipulation of the memory color or the change manipulation of the color information of the selected memory color using the memory color management window 340 (step S235), the processor 120 stores the memory color selected by the input selection manipulation or the memory color having the color information changed by the input change manipulation in the user color table 140b as the user color (step S240).

Meanwhile, if the user inputs the selection manipulation of the extraction color or the change manipulation of the color information of the selected extraction color using the extraction color management window 350 (step S245), the processor 120 stores the extraction color selected by the input selection manipulation or the extraction color having the color information changed by the input change manipulation in the user color table 140b as the user color (step S250).

Thereafter, the processor displays the user color stored at steps S220, S230, S240 and S250 in the user color list window 360 (step S255). Accordingly, the user can confirm that the color corresponding to the user's selection/change is additionally stored as the user color.

Additionally, if the user inputs a user color export command using the menu item bar 310 (step S260), the processor converts the user colors stored in the user color table 140b so that they can be used in the image editing program (step S265). Through the conversion process at step S265, the user color becomes usable in the image editing program.

Meanwhile, in performing step S220, the processor 120 may be implemented to further perform the process of converting the image displayed in the preview window 370 according to the selected color scheme or the color scheme having the changed color scheme information to display the converted image. For example, if the color scheme for presenting the natural emotion is selected, the image displayed in the preview window 370 is converted according to the color scheme to display the converted image.

For a detailed explanation, an image 375 displayed in the preview window 370 is illustrated in FIG. 5A, and images 375a, 375b, 375c, 375d and 375e converted according to the different color schemes are illustrated in FIG. 5B.

In addition, in performing steps S230, S240 and S250, the processor 120 may be implemented to further perform the process of converting the image displayed in the preview window 370 based on the selected color or the color having the changed color information to display the converted image. For example, the value and/or saturation of the colors that constitute the image are changed into the value and/or saturation of the colors that are equal to those of the changed color or the color having the changed color information at the above-described steps to display the changed image.

According to one exemplary embodiment of the present invention, the color schemes are arranged in the color scheme list 325 displayed in the color scheme management window 320 in two dimensions. However, this is just exemplary, and there is no limit to the manner of arranging the color schemes in the color scheme list 325. Accordingly, it is also possible to arrange the color schemes in the color scheme list 325 in one dimension or in three dimensions. In the same manner, there is no limit to the manner of arranging the memory colors in the memory color list 345 displayed in the memory color management window 340.

As described above, according to embodiments of the present invention, since a selected color scheme or a selected color scheme having changed color information can be stored, the stored color scheme as well as the stored color can subsequently be used. Also, since a memory color can be selected as a desired color, the user's color selection becomes still more convenient and easy. Additionally, since it is possible to select a desired standard color using a standard color list arranged in a user interface screen in three dimensions, the user's color selection can be performed more conveniently and easily, and an excellent visual effect can be obtained.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A color management method comprising the steps of:
displaying a color scheme list on a display device of a color management apparatus, wherein the color scheme list comprises a list of color schemes for providing a standard for converting the colors that constitute an image; and
storing the color scheme selected by a selection manipulation in a storage of the color management apparatus if the selection manipulation of one among the color schemes that constitute the displayed color scheme list is input;
wherein the displaying step comprises classifying at least one color scheme having the same color emotion into one group and displaying the at least one color scheme in the group along with another group containing color schemes having different color emotions.

2. The color management method as claimed in claim 1, further comprising the step of storing the color scheme of which the color scheme information is changed by a change manipulation in the storage of the color management apparatus if the change manipulation of color scheme information of the selected color scheme is input.

3. The color management method as claimed in claim 2, further comprising the step of converting the stored color scheme so that the stored color scheme can be used in a program for image editing.

4. The color management method as claimed in claim 1, wherein the color scheme comprises two or more colors in order to present a specified color emotion.

5. The color management method as claimed in claim 1, wherein the color scheme list is a list in which the color schemes are arranged in one dimension, in two dimensions or in three dimensions.

6. The color management method as claimed in claim 1, further comprising the steps of:
displaying a standard color list in which standard colors are arranged in three dimensions; and
storing the standard color selected by a selection manipulation if the selection manipulation of one among the standard colors that constitute the displayed standard color list is input.

7. The color management method as claimed in claim 1, further comprising the steps of:
displaying a memory color list which is a list of memory colors that are colors of things and that are named and memorized as names of the things; and
storing the memory color selected by a selection manipulation if the selection manipulation of one among the memory colors that constitute the displayed memory color list is input.

8. The color management method as claimed in claim 7, further comprising the step of storing the memory color of which the color information is changed by a change manipulation if the change manipulation of color information of the selected memory color is input.

9. The color management method as claimed in claim 8, further comprising the step of converting the stored memory color so that the stored memory color can be used in an image editing program.

10. The color management method as claimed in claim 7, wherein the memory color list is a list in which the memory colors are arranged in one dimension, in two dimensions or in three dimensions.

11. A color management system for an image forming apparatus comprising:
a display unit for displaying a specified list;
an input unit for inputting a specified manipulation command;
a storage unit for storing specified information; and
a processor for displaying on the display unit a color scheme list, wherein the color scheme list is a list of color schemes for providing a standard for converting the colors that constitute an image, and storing to the storage unit the color scheme selected by a selection manipulation if the selection manipulation of one among the color schemes that constitute the displayed color scheme list is input by the input unit;
wherein the display unit classifies at least one color scheme having the same color emotion into one group and displays the at least one color scheme in the group along with another group containing color schemes having different color emotions.

12. The color management apparatus as claimed in claim 11, wherein the color scheme comprises two or more colors in order to present a specified color emotion.

13. The color management apparatus as claimed in claim 11, wherein the processor displays on the display unit a standard color list in which standard colors are arranged in three dimensions, and stores to the storage unit the standard color selected by a selection manipulation if the selection manipulation of one among the standard colors that constitute the displayed standard color list is input by the input unit.

14. The color management apparatus as claimed in claim 11, wherein the processor displays on the display unit a memory color list which is a list of memory colors that are colors of things and that are named and memorized as names of the things, and stores to the storage unit the memory color selected by a selection manipulation if the selection manipulation of one among the memory colors that constitute the displayed memory color list is input by the input part.

15. A non-transitory computer-readable medium encoded with instructions capable of being executed by a computer for controlling an apparatus to manage colors comprising:
a first set of instructions adapted to control the apparatus to display a color scheme list, wherein the color scheme list is a list of color schemes for providing a standard for converting the colors that constitute an image; and
a second set of instructions adapted to control the apparatus to store the color scheme selected by a selection manipulation if the selection manipulation of one among the color schemes that constitute the displayed color scheme list is input;
wherein the first set of instructions further controls the apparatus to classify at least one color scheme having the same color emotion into one group and displays the at least one color scheme in the group along with another group containing color schemes having different color emotions.

16. The non-transitory computer-readable medium as claimed in claim 15, wherein the color scheme comprises two or more colors in order to present a specified color emotion.

17. The non-transitory computer-readable medium as claimed in claim 15, further comprising:
a third set of instructions adapted to control the apparatus to display a standard color list in which standard colors are arranged in three dimensions; and
a fourth set of instructions adapted to control the apparatus to store the standard color selected by a selection manipulation if the selection manipulation of one among the standard colors that constitute the displayed standard color list is input.

18. The non-transitory computer-readable medium as claimed in claim 15, further comprising:
a third set of instructions adapted to control the apparatus to display a memory color list which is a list of memory colors that are colors of things and that are named and memorized as names of the things; and
a fourth set of instructions adapted to control the apparatus to store the memory color selected by a selection manipulation if the selection manipulation of one among the memory colors that constitute the displayed memory color list is input.

* * * * *